(12) United States Patent
Dong et al.

(10) Patent No.: US 10,664,756 B2
(45) Date of Patent: *May 26, 2020

(54) SCALABLE STREAMING DECISION TREE LEARNING (71) Applicant: International Business Machines Corporation, Armonk, NY (US)

(72) Inventors: Wei Shan Dong, Beijing (CN); Peng Gao, Beijing (CN); Guo Qiang Hu, Shanghai (CN); Chang Sheng Li, Beijing (CN); Xu Liang Li, Beijimg (CN); Chun Yang Ma, Beijing (CN); Zhi Wang, Beijing (CN); Xin Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 867 days.

This patent is subject to a terminal disclaimer.

(21) Appl. No.: 14/953,457

(22) Filed: Nov. 30, 2015

(65) Prior Publication Data

US 2017/0061327 A1 Mar. 2, 2017

Related U.S. Application Data (63) Continuation of application No. 14/833,397, filed on Aug. 24, 2015.

(51) Int. Cl.
*G06N 5/02* (2006.01)
(52) U.S. Cl.
CPC .............. *G06N 5/02* (2013.01); *G06N 5/025* (2013.01)
(58) Field of Classification Search
CPC .................................. G06N 5/02; G06N 5/025
See application file for complete search history.

(56) References Cited

U.S. PATENT DOCUMENTS 8,311,959 B2 11/2012 Aggarwal et al.
8,331,699 B2 12/2012 Dewan et al.
(Continued)

OTHER PUBLICATIONS

Ben-Haim, Yael, and Elad Tom-Tov. "A streaming parallel decision tree algorithm." Journal of Machine Learning Research (Feb. 11, 2010): 849-872. (Year: 2010).*

(Continued)

*Primary Examiner* — Miranda M Huang
*Assistant Examiner* — Kevin W Figueroa
(74) *Attorney, Agent, or Firm* — Cantor Colburn LLP; Joseph Petrokaitis (57) ABSTRACT

In one embodiment, a computer-implemented method includes receiving training data including a plurality of records, each record having a plurality of attributes. The training data is horizontally parallelized across two or more processing elements. This horizontal parallelizing includes dividing the training data into two or more subsets of records; assigning each subset of records to a corresponding processing element of the two or more processing elements; transmitting each subset of records to its assigned processing element; and sorting, at the two or more processing elements, the two or more subsets of records to two or more candidate leaves of a decision tree. The output from horizontally parallelizing is converted into input for vertically parallelizing the training data. The training data is vertically parallelized across the two or more processing elements. The decision tree is grown based at least in part on the horizontally parallelizing, the converting, and the vertically parallelizing.

6 Claims, 4 Drawing Sheets

(56) References Cited

U.S. PATENT DOCUMENTS

| | | | |
|---|---|---|---|
| 8,392,153 | B2 | 3/2013 | Pednault et al. |
| 8,762,369 | B2 | 6/2014 | Macho et al. |
| 8,849,790 | B2 | 9/2014 | Bellare et al. |
| 2017/0061318 | A1 | 3/2017 | Dong et al. |

OTHER PUBLICATIONS

Amado, Nuno, Joao Gama, and Fernando Silva. "Parallel implementation of decision tree learning algorithms." Portuguese Conference on Artificial Intelligence. Springer, Berlin, Heidelberg, 2001. (Year: 2001).*

Vu, Anh Thu, et al. "Distributed adaptive model rules for mining big data streams." 2014 IEEE International Conference on Big Data (Year: 2014).*

List of IBM Patents or Patent Applications Treated as Related; (Appendix P), Filed Oct. 11, 2018; 2 pages.

"Apache Samoa—Scalable Advance Massive Online Analysis"; Retrieve online from http://samoa.incubator.apache.org/ on Aug. 21, 2015; p. 1-8.

"Real Time Analytics for Data Streams"; MOA Massive Online Analysis; Retrieved online from http://moa.cms.waikato.ac.nz/ on Aug. 21, 2015; pp. 1-3.

Ikonomovska et al.; "Learning Model Trees From Evolving Data Streams"; Data Mining and Knowledge Discovery; vol. 23, No. 1; Jul. 2011; pp. 128-168.

Read et al.; "Scalable and Efficient Multi-Label Classification for Evolving Data Streams"; Machine Learning; vol. 88, Issue 1-2; Jul. 2012; pp. 243-272.

Wozniak; "A Hybrid Decision Tree Training Methos Using Data Streams"; Knowledge and Information Systems; vol. 29, Issue 2; Nov. 2011; pp. 335-347.

Ye et al.; "Stochastic Gradient Boosted Distributed Decision Trees"; CIKM'09; Nov. 2-6, 2009; 4 Pages.

* cited by examiner

SCALABLE STREAMING DECISION TREE LEARNING

DOMESTIC PRIORITY

This application is a continuation of U.S. patent application Ser. No.: 14/833,397 filed Aug. 24, 2015, and all the benefits accruing therefrom under 35 U.S.C. § 119, the contents of which is herein incorporated by reference in its entirety.

BACKGROUND

Various embodiments of this disclosure relate to decision trees and, more particularly, to scalable streaming decision tree learning.

Many applications require the processing of Big data, which may be at rest or in motion. Big data is a broad term for data sets so large or complex that traditional data processing applications are inadequate. Challenges include analysis, capture, data curation, search, sharing, storage, transfer, visualization, and information privacy. When the data is in motion, processing it may need to take place in real time. One mechanism for processing data is through the use of decision trees.

When a decision tree is used, data can be classified by stepping through the nodes of the tree based on known attributes of the data. At each node, a child node is selected based on the value of an attribute of the data, and this selection process may continue until a leaf of the tree is selected. The leaf may be associated with a value to be assigned as a classification value for the data.

Decision tree learning is a form of classification learning, used to determine how to classify data. In decision tree learning, a system generates a decision tree that will be used to classify data based on observed attributes. Through the generation of the decision tree, which is an iterative generation, each interior node is split into subsets, with a child node at the root of each subset, based on the value of an attribute associated with that interior node. Each edge leading from the interior node to a child node corresponds to a particular value of the attribute. If no more attributes are available, a node then becomes a leaf node in the final decision tree, corresponding to a classification or prediction of a final value for the data.

In some systems, parallelism is used to speed up decision tree learning where a large amount of training data is being used as input into generating the decision tree. Specifically, either horizontal of vertical parallelism is used. The data generally includes multiple records, with each record containing multiple attributes, or columns. With vertical parallelism, the set of attributes are divided among available processing elements. In other words, each processing element receives data from multiple records, but the data received by each processing element includes only a subset of the existing attributes. With horizontal parallelism, the set of records are divided among available processing elements. In this case, each processing element receives data from one or more records, including every attribute for the subset of records assigned to that processing element.

Each processing element operates on the data assigned to it. The results of these operations are then aggregated together to complete generation of the decision tree.

SUMMARY

In one embodiment of this disclosure, a computer-implemented method includes receiving training data including a plurality of records, where each of the plurality of records has a plurality of attributes. The training data is horizontally parallelized across two or more processing elements. This horizontal parallelizing includes dividing the training data into two or more subsets of records; assigning each subset of records to a corresponding processing element of the two or more processing elements; transmitting each subset of records to its assigned processing element; and sorting, at the two or more processing elements, the two or more subsets of records to two or more candidate leaves of a decision tree. The output from the horizontally parallelizing is converted into input for vertically parallelizing the training data. The training data is vertically parallelized across the two or more processing elements. This vertical parallelizing includes dividing the training data into two or more subsets of attributes; assigning each subset of attributes to a corresponding processing element of the two or more processing elements; and transmitting each subset of attributes of the plurality of records to the assigned processing element for the subset of attributes. The decision tree is grown based at least in part on the horizontally parallelizing, the converting, and the vertically parallelizing.

In another embodiment, a system includes a memory and one or more computer processors communicatively coupled to the memory. The one or more computer processors are configured to receive training data including a plurality of records, each of the plurality of records having a plurality of attributes. The one or more computer processors are further configured to horizontally parallelize the training data across two or more processing elements. To horizontally parallelize the training data, the one or more computer processors are further configured to divide the training data into two or more subsets of records; assign each subset of records to a corresponding processing element of the two or more processing elements; transmit each subset of records to its assigned processing element; and sort, at the two or more processing elements, the two or more subsets of records to two or more candidate leaves of a decision tree. The one or more computer processors are further configured to convert output from the horizontally parallelizing into input for vertically parallelizing the training data. The one or more computer processors are further configured to vertically parallelize the training data across the two or more processing elements. To vertically parallelize the training data, the one or more computer processors are further configured to divide the training data into two or more subsets of attributes; assign each subset of attributes to a corresponding processing element of the two or more processing elements; and transmit each subset of attributes of the plurality of records to the assigned processing element for the subset of attributes. The one or more computer processors are further configured to grow the decision tree based at least in part on the horizontally parallelizing, the converting, and the vertically parallelizing.

In yet another embodiment, a computer program product for generating a decision tree includes a computer readable storage medium having program instructions embodied therewith. The program instructions are executable by a processor to cause the processor to perform a method. The method includes receiving training data including a plurality of records, where each of the plurality of records has a plurality of attributes. Further according to the method, the training data is horizontally parallelized across two or more processing elements. This horizontal parallelizing includes dividing the training data into two or more subsets of records; assigning each subset of records to a corresponding processing element of the two or more processing elements;

transmitting each subset of records to its assigned processing element; and sorting, at the two or more processing elements, the two or more subsets of records to two or more candidate leaves of a decision tree. The output from the horizontally parallelizing is converted into input for vertically parallelizing the training data. The training data is vertically parallelized across the two or more processing elements. This vertical parallelizing includes dividing the training data into two or more subsets of attributes; assigning each subset of attributes to a corresponding processing element of the two or more processing elements; and transmitting each subset of attributes of the plurality of records to the assigned processing element for the subset of attributes. The decision tree is grown based at least in part on the horizontally parallelizing, the converting, and the vertically parallelizing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are configured to grow, also referred to as learning or generating, decision trees based on training data. Generally, vertical parallelism works well for this purpose when the dimension of data is high (i.e., when there are many attributes), and horizontal parallelism works well when the rate at which the data arrives is high. However, conventional mechanisms are not scalable to work well for situations in which data arrives at high velocity and has a high dimension. Various embodiments of this disclosure address such situations.

Figure 1:
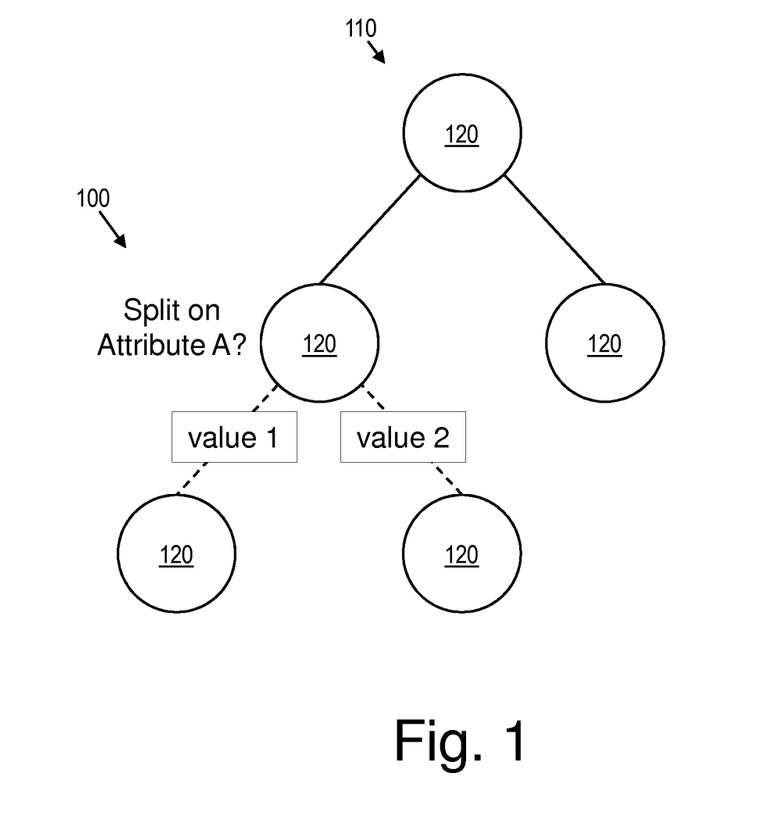
FIG. 1 is a diagram of an example decision tree upon which a tree-growing system may operate, according to some embodiments of this disclosure.

FIG. 1 is a diagram of an example decision tree 110 upon which a tree-growing system 100, according to some embodiments herein, may operate. In this example, the tree-growing system 100 has already begun growing the decision tree 110. Each node 120 of the decision tree 110 may represent an operator. Specifically, the operator of a node 120 may determine which edge an item of data takes from that node 120 to a child node 120 by examining a particular attribute of the item. In other words, each operator examines a single attribute, and that attribute can be referred to as the attribute upon which the associated node 120 is split. Each value of the attribute may lead to a distinct child node 120 connected to the node 120 in question by a single edge.

When growing the decision tree 110, the tree-growing system 100 may examine each leaf node 120, or leaf, of the decision tree 110. For each leaf, the tree-growing system 100 may decide whether to split that leaf and, if so, on which attribute to split the leaf.

Figure 2:
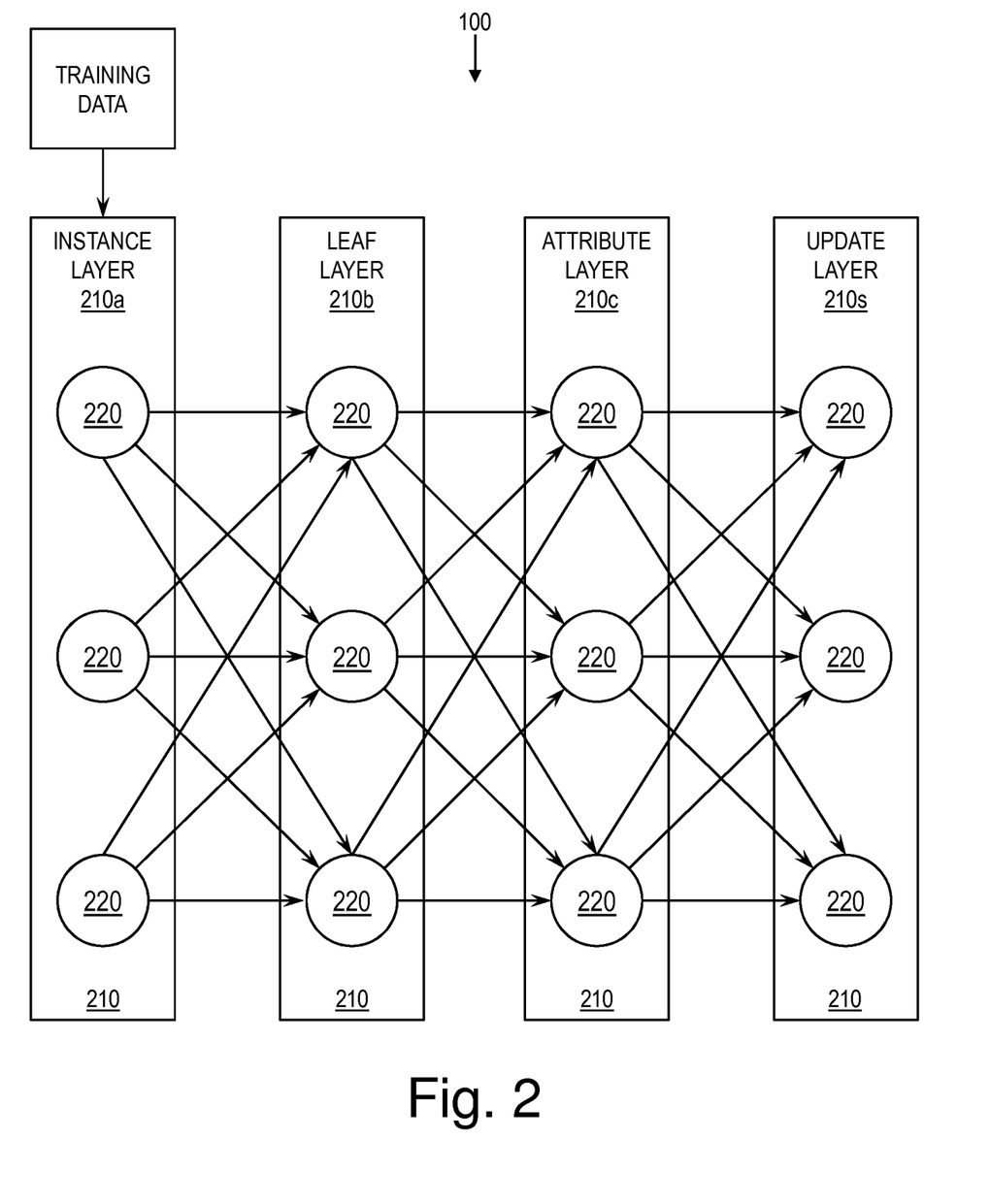
FIG. 2 is a block diagram of the tree-growing system, according to some embodiments of this disclosure.

FIG. 2 is a block diagram of the tree-growing system 100, according to some embodiments of this disclosure. As shown the, tree-growing system 100 may have one or more processing layers 210. At each layer, two or more processing elements 220 may perform activities in processing training data, so as determine how to grow the decision tree 110. As a result, the training data may be parallelized, or distributed, across the processing elements 220 within a processing layer 210 for growing the decision tree 110. In some embodiments, the processing layers 210 need not be distinct from one another; rather, the processing elements 220 in one processing layer 210 may be the same processing elements 210 as in another processing layer 210. However, the processing layers 210 may represent distinct layers, or sets of operations, in processing the training data. The training data may be re-parallelized when passing between the various layers 210.

Figure 3:
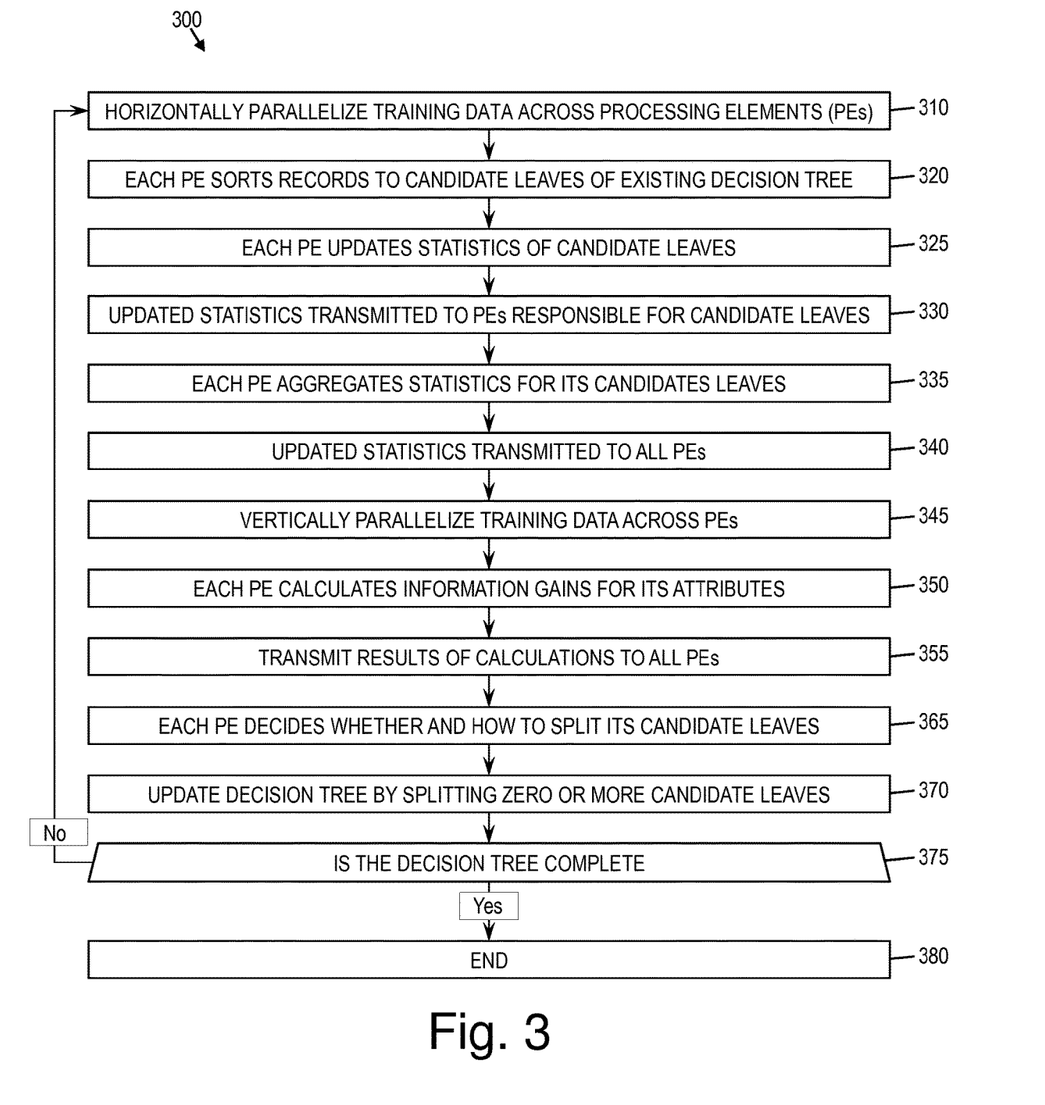
FIG. 3 is a flow diagram of a method for growing the decision tree, according to some embodiments of this disclosure.

FIG. 3 is a flow diagram of a method 300 for growing a decision tree 110, according to some embodiments of this disclosure. This method 300 may be performed by the tree-growing system 100.

At block 310, the tree-growing system 100 may horizontally parallelize a set of training data. More specifically, the tree-growing system 100 may divide the training data into sets of records, which may be non-overlapping sets. Each set of records may be directed to its associated processing element 220 for processing. Each processing element 220 may receive its set of records, which may be a subset of the complete training data.

At block 320, within a first processing layer 210a, referred to as the instance layer of the tree-growing system 100, each processing element 220 may sort each of its records to a leaf of the decision tree 110. The leaves to which records are sorted may then become candidate leaves for splitting in growing the decision tree. In other words, each candidate leaf may have the potential to be split in the current pass through the processing layers 210.

After sorting the records to the applicable candidate leaves, at block 325, each processing elements 220 may update the statistics associated with the candidate leaves based on the records sorted to them. Each leaf of the decision tree 110 may be associated with statistics related to data records sorted to that leaf. Those statistics may include, for example, a count of how many records have been sorted to that leaf. Thus, in response to a record being sorted to a leaf, the statistics associated with that leaf may be updated, which may include incrementing the count associated with the leaf. In some embodiments, each processing element 220 may have access to its own replica of the decision tree 110. Thus, this updating of statistics may be performed locally by each processing element 220, on only the local replica of the decision tree 110.

At block 330, the candidate leaves may be grouped into sets of leaves, with each set being associated with a particular processing element 220 that is responsible for that leaf. In some embodiments, the sets of leaves may be non-overlapping, such that a leaf associated with a first processing element 220 is associated with no other processing element. At this block, for each candidate leaf, the statistical information for that candidate leaf in the various decision tree replicas may be transmitted to the processing element 220 responsible for that leaf. In some cases, one or more records from across the various processing elements 220 may have been sorted to the same leaf, and in that case, the updated statistical information related to those one or more records may then be directed to the same processing element 220 at block 330.

At this point, each processing element 220 may receive updated statistical data from the other processing elements 220 for each candidate leaf for which the processing element is responsible. At block 335, within a second layer 210*b*, referred to as the leaf layer of the tree-growing system 100, each processing element 220 may aggregate the statistical data for each candidate leaf for which the processing element 220 is responsible. In other words, for example, statistical data that was updated based on sorting a first record to a first leaf at a first processing element 220 may be aggregated with other statistical data that was updated based on sorting other records to the first leaf at other processing elements 220. Thus, each processing element 220 may have aggregated data for each candidate leaf for which it is responsible.

At block 340, each processing element 220 may transmit the updated statistical information for each of its assigned leaves to the other processing elements 220, such that each processing element 220 then has the updated and aggregated statistical data for all candidate leaves.

The tree-growing system 100 may then vertically parallelize the processing of training data across the processing elements. Specifically, at block 340, each processing element may be assigned a set of attributes, with each set of attributes being a subset of all the attributes in the training data. Further, the sets of attributes may be non-overlapping, such that a particular attribute is assigned to no more than a single processing element 220.

Thus, given that the training data is horizontally parallelized in the instance layer 210*a* and vertically parallelized in an attribute later 210*c*, which is discussed below, the intermediate leaf layer 210*b* may receive as input horizontally parallelized data and may convert that data into vertically parallelized data. Due to the leaf layer 210*b*, the tree-growing system 100 may enable both horizontal and vertical parallelization when determining whether and how to split candidate leaves. The tree-growing system 100 may thus be scalable both vertically and horizontally.

At block 350, within a third layer 210*c*, referred to as the attribute layer of the tree-growing system 100, each processing element 220 may calculate an information gain of splitting each candidate leaf at the attributes assigned to that processing element 220. Given a current state of the decision tree 110, and given a current candidate leaf, there may exist an information gain related to each attribute. The information gain associated with an attribute may represent the benefit of splitting the leaf on that attribute. Various existing mechanisms may be used for calculating the information gain of an attribute for the purpose of growing a decision tree, and these existing mechanisms may be used in implementing the present tree-growing system 100.

At block 355, the result of the calculations of information gains may be shared with all other processing elements 220. In other words, each processing element 220 may transmit the result of its information gain calculations to the other processing elements 220.

The candidate leaves may be once again divided into sets of leaves, with each set being associated with a particular processing element 220 that is responsible for that leaf. In some embodiments, the sets may be non-overlapping, such that a leaf associated with a first processing element 220 is associated with no other processing element. At block 365, within a fourth layer 210*d*, referred to as the update layer of the tree-growing system 100, for each candidate leaf for which a processing element 220 is responsible, that processing element 220 may determine whether and on which attribute to split that leaf. Specifically, the processing element 220 may aggregate all the information gain values associated with the various attributes for the leaf in question. The processing element 220 may then split the leaf according to the decision tree's growing criteria, which are the criteria for selecting which attribute on which to split a leaf, given the information gains associated with the various attributes for that leaf. Various growing criteria exist in the art, based on information gain values, and such criteria may be used with embodiments of the present tree-growing system 100.

At block 370, the decision tree 110 may be updated by splitting the decision tree 110 at zero or more candidate leaves based on the decisions made by the various processing elements 220 in block 365. At decision block 375, it may be determined whether the decision tree 110 is complete. In some embodiments, the decision tree 110 may be considered complete if no candidate leaves were split in the pass through the processing layers 210. If the decision tree 110 is complete, then the method 300 may end at block 380. Alternatively, if the decision tree 110 is not complete, then the method 300 may return to block 310 to continue growing the decision tree 110.

Figure 4:
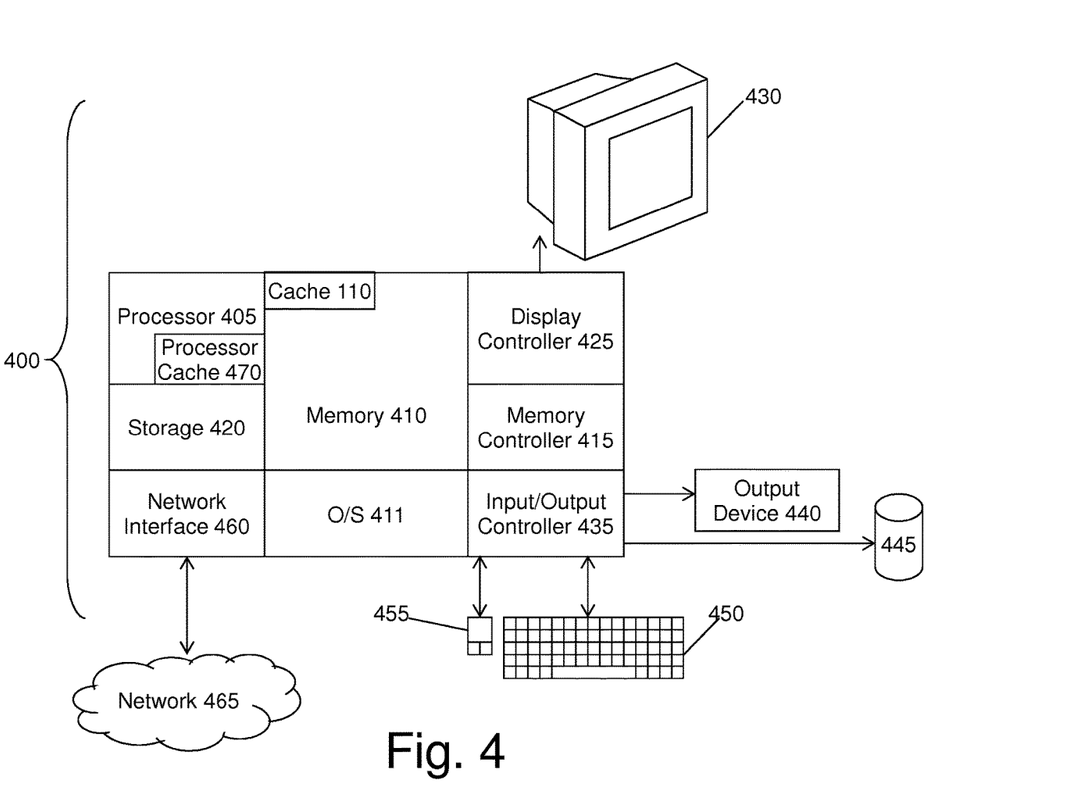
FIG. 4 is a block diagram of a computer system for implementing some or all aspects of the tree-growing system, according to some embodiments of this disclosure.

FIG. 4 illustrates a block diagram of a computer system 400 for use in implementing a tree-growing system or method according to some embodiments. The tree-growing systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For example, and not by way of limitation, each processing element 220 may be a processor 405, or core of a processor 405, of the computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the tree-growing systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Tree-growing systems and methods according to this disclosure may be embodied, in whole or in part, in computer program products or in computer systems 400, such as that illustrated in FIG. 4.

Technical effects and benefits of some embodiments include the ability to further parallelize decision tree learning, so as to better leverage the parallelization capacity of a computer system 100. Some embodiments may use both vertical and horizontal parallelization to more efficiently grow a decision tree, as compared to conventional systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, with a processing device, training data comprising a plurality of records, each of the plurality of records comprising a plurality of attributes;
   horizontally parallelizing the training data across two or more processing elements, wherein the horizontally parallelizing the training data comprises:
      dividing the training data into two or more subsets of records;
      assigning each subset of records to a corresponding processing element of the two or more processing elements;
      transmitting each subset of records to its assigned processing element; and
      sorting, at the two or more processing elements, the two or more subsets of records to two or more candidate leaves of two or more decision trees;
   converting output from the horizontally parallelizing into input for vertically parallelizing the training data by:
      updating statistical information for each candidate leaf in the two or more candidate leaves for corresponding replica decision trees in the two or more replica decision trees based on records sorted to each candidate leaf, wherein each processing element of the two or more processing elements is associated with a replica decision tree in the two or more replica decision trees;

wherein the statistical information comprises a record count for each candidate leaf, the record count corresponding to a number of records sorted to each candidate leaf; and aggregating the statistical information for each candidate leaf with corresponding candidate leaves in the two or more replica decision trees;

vertically parallelizing the training data across the two or more processing elements, wherein the vertically parallelizing the training data comprises:

dividing the training data into two or more subsets of attributes;

assigning each subset of attributes to a corresponding processing element of the two or more processing elements; and transmitting each subset of attributes of the plurality of records to the assigned processing element for the subset of attributes; and growing the decision tree based at least in part on the horizontally parallelizing, the converting, and the vertically parallelizing.

2. The method of claim 1, wherein the converting the output from the horizontally parallelizing into the input for vertically parallelizing the training data comprises:

dividing the two or more candidate leaves of the decision tree into two or more subsets of candidate leaves; and assigning each of the two or more subsets of candidate leaves to a corresponding processing element of the two or more processing elements.

3. The method of claim 1, wherein the vertically parallelizing the training data further comprises:

calculating, at each of the two or more processing elements, an information gain of splitting a first candidate leaf on each of the attributes in the subset of attributes assigned to the processing element.

4. The method of claim 3, further comprising:

aggregating results of the calculating the information gain; and determining how to split each of the two or more candidate leaves of the decision tree, based at least in part on the aggregated results.

5. The method of claim 4, wherein the growing the decision tree based at least in part on the horizontally parallelizing, the converting, and the vertically parallelizing comprises updating the decision tree based on the determining how to split each of the two or more candidate leaves.

6. The method of claim 1, further comprising repeating the horizontally parallelizing, the converting, and the vertically parallelizing until the decision tree is complete.

* * * * *